(12) United States Patent
Dent (10) Patent No.: US 8,526,482 B2
(45) Date of Patent: Sep. 3, 2013

(54) NON-CONTIGUOUS VARIABLE LENGTH ORTHOGONAL CODES

(75) Inventor: Paul Wilkinson Dent, Pittsboro, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1787 days.

(21) Appl. No.: 11/631,790

(22) PCT Filed: Jul. 6, 2005

(86) PCT No.: PCT/SE2005/001129
§ 371 (c)(1),
(2), (4) Date: Jun. 6, 2007

(87) PCT Pub. No.: WO2006/004550
PCT Pub. Date: Jan. 12, 2006

(65) Prior Publication Data
US 2007/0248148 A1  Oct. 25, 2007

Related U.S. Application Data

(60) Provisional application No. 60/585,097, filed on Jul. 6, 2004.

(51) Int. Cl.
*H03C 1/52* (2006.01)

(52) U.S. Cl.
USPC ........... 375/135; 375/130; 375/146; 375/219; 375/301

(58) Field of Classification Search
USPC ................. 375/130, 134, 135, 136, 137, 219, 375/220, 222, 295, 302, 240, 240.02, 240.11, 375/240.08, 240.23, 240.24, 296, 301, 316, 375/324, 321, 3, 26, 340, 346, 347, 363; 380/268, 270
See application file for complete search history.

(56) References Cited

U.S. PATENT DOCUMENTS

| | | | |
|---|---|---|---|
| 4,476,566 A | 10/1984 | Dent | |
| 5,151,919 A | 9/1992 | Dent | |
| 5,353,352 A | 10/1994 | Dent et al. | |
| 5,550,809 A | 8/1996 | Bottomley et al. | |

(Continued)

FOREIGN PATENT DOCUMENTS

| WO | WO 99/12284 | 3/1999 |
|---|---|---|
| WO | WO 01/01584 A2 | 1/2001 |
| WO | 03/081797 | 10/2003 |

OTHER PUBLICATIONS

U.S. Appl. No. 11/631,789, filed Jan. 8, 2007, entitled Imbalanced Transmission Combining at Radio Base Station.

(Continued)

*Primary Examiner* — Sam K Ahn
*Assistant Examiner* — Linda Wong
(74) *Attorney, Agent, or Firm* — Nixon & Vanderhye, P.C.

(57) ABSTRACT

Systems for transmitting information symbols utilize ternary codes or pivot codes in conjunction with spread spectrum encoding. The systems comprise at least a first symbol source for supplying an information signal comprising at least a first stream of I,Q bit pairs, means for using either a ternary code or at least one pivot code for spreading the at least first stream of I,Q bit pairs and thereby respectively forming first chips and second chips, and a radio signal modulator for transmitting the first chips and second chips over a radio interface.

11 Claims, 4 Drawing Sheets

(56) References Cited

U.S. PATENT DOCUMENTS

| | | | |
|---|---|---|---|
| 5,742,678 A | 4/1998 | Dent et al. | |
| 5,771,288 A | 6/1998 | Dent et al. | |
| 6,122,266 A | 9/2000 | Lynch | |
| 6,215,762 B1 | 4/2001 | Dent | |
| 6,229,796 B1 | 5/2001 | Dent | |
| 6,317,422 B1* | 11/2001 | Khaleghi et al. | 370/342 |
| 6,359,874 B1 | 3/2002 | Dent | |
| 6,363,107 B1* | 3/2002 | Scott | 375/150 |
| 6,388,998 B1 | 5/2002 | Kasturia | |
| 6,473,395 B1 | 10/2002 | Lee | |
| 6,580,747 B1* | 6/2003 | Lipponen | 375/140 |
| 6,590,889 B1 | 7/2003 | Preuss et al. | |
| 6,618,430 B1* | 9/2003 | Khaleghi et al. | 375/147 |
| 6,643,319 B1* | 11/2003 | Suzuki et al. | 375/145 |
| 6,766,337 B1* | 7/2004 | Bae et al. | 708/250 |
| 7,031,369 B2* | 4/2006 | Kurabe et al. | 375/140 |
| 7,173,900 B1* | 2/2007 | Sundararajan | 370/209 |
| 7,349,421 B2 | 3/2008 | Shanbhag | |
| 8,004,959 B2 | 8/2011 | Dent | |
| 2001/0031010 A1 | 10/2001 | Shanbhag | |
| 2002/0136269 A1* | 9/2002 | Kurabe et al. | 375/140 |
| 2002/0171568 A1 | 11/2002 | Yang | |
| 2002/0172180 A1 | 11/2002 | Hall et al. | |
| 2003/0002566 A1* | 1/2003 | McDonough et al. | 375/147 |
| 2003/0016733 A1 | 1/2003 | Sha | |
| 2004/0071115 A1 | 4/2004 | Earnshaw et al. | |
| 2004/0179581 A1* | 9/2004 | Ozluturk | 375/141 |
| 2004/0213334 A1* | 10/2004 | Ledvina et al. | 375/150 |
| 2004/0252667 A1* | 12/2004 | Dent | 370/335 |
| 2005/0025218 A1* | 2/2005 | Briles | 375/130 |
| 2005/0226351 A1* | 10/2005 | Huang et al. | 375/343 |
| 2007/0248148 A1 | 10/2007 | Dent | |

OTHER PUBLICATIONS

U.S. Office Action mailed Sep. 17, 2010 in U.S. Appl. No. 11/631,789.

Final Office Action mailed Feb. 23, 2011 in U.S. Appl. No. 11/631,789.

International Search Report for PCT/SE2005/001129 mailed Dec. 23, 2005.

Cha et al., *ZCD-UWB system using enhanced ZCD codes Ultra Wideband Systems*, 2004, Joint with Conference on Ultrawideband Systems and Technologies, Joint UWBST & IWUWBS, XP010715178.

Garg et al., *Applications of CDMA in Wireless/Personal Communications*, Prentice Hall, 1997.

\* cited by examiner

NON-CONTIGUOUS VARIABLE LENGTH ORTHOGONAL CODES

This application is the U.S. national phase of internation application PCT/SE2005/001129 file Jul. 6, 2005, which designated the U.S. and claims priority to U.S. Provisional Application No. 60/585,097 filed Jul. 9, 2004, the entire content of each Of which is hereby incorporated by reference. This application is related to simultaneously filed PCT application PCT/SE05/01130, entitled "DIFFERENT ORTHOGONAL CODE SETS WITH MEMBERS IN COMMON", also incorporated herein by reference in its entirety, and which had national stage entry into the United States as U.S. patent application Ser. No. 11/631,789, which issued as U.S. Pat. No. 8,004,959.

BACKGROUND

1. Technical Field

The invention is useful in Code Division Multiple Access communications systems employing orthogonal codes.

2. Related Art and Other Considerations

The term Code Division Multiple Access (CDMA) refers to a method by which multiple transmitting stations (e.g., mobile phones) can communicate their independent data streams to a common receiver (e.g., a cellular base station receiver). The communication of multiple data streams from a common transmitter (i.e., a cellular base station) to a plurality of receivers (i.e., different mobile phones) by Code Division is perhaps more properly referred to as Code Division Multiplex. However, for sake of simplicity the two terms Code Division Multiple Access and Code Division Multiplex will herein be regarded as equivalent. Thus CDMA will be used as a term of description for both the uplink and the downlink, even though the downlink may be more accurately described as Code Division Multiplex (CDM).

The use of orthogonal Walsh codes in communications systems is well known. The Code Division Multiple Access system known as IS59 uses Walsh codes of length 64 to scramble signals transmitted by a cellular base station to different mobile stations, the orthogonality of the codes reducing interference between signals intended for different mobiles. The IS95 return link uses all 64, length-64 Walsh codes in every mobile station to encode 6-bit data blocks, the different mobile transmissions being rendered unlike by the use of different scrambling sequences. This return link or uplink use of the Walsh codes does not attempt to make different signals orthogonal, but rather is a form of error correction coding called (64,6) orthogonal block encoding. See, for example, Garg, Vijay K. et al., *Applications of CDMA in Wireless/Personal Communications*, Prentice Hall (1997), which is incorporated herein by reference.

The wideband CDMA cellular system known as UMPTS also uses orthogonal Walsh codes to discriminate between different base-to-mobile links. In this case, the orthogonal codes are not of a fixed length, but depend on the datarate of a particular link. Nevertheless, signals of different code length and datarate remain nominally orthogonal to each other.

For example, consider two Walsh codes of length 16, the first code being 1111111100000000 and the second code being 1100110000110011. The first code may be used to spread a first signal by multiplying each symbol to be transmitted by the code and transmitting the resulting sixteen chips. The second code may be used to spread a different datastream. The two spread signals are nominally orthogonal as the first code and the second code differ in as many chip positions as they agree, resulting in zero correlation.

However, the second code is also orthogonal to the first code even if only the first or last eight chips of it are considered, as within the first eight chips the second code agrees and disagrees with the first code's first eight chips in half the chip positions. The same is true for the second eight chips. Therefore a first data symbol may be spread using the first eight chips and a second data symbol may be spread with the second eight chips while retaining orthogonality with the first code. This process of subdivision may continue, as the first four chips of the second code are also orthogonal to the first four chips of the first code. The subdivision to two chip codes however, in the particular example of the two codes mentioned in the preceding paragraph, does not retain orthogonality. However, another Walsh code, 0101010101010101 can be fractured down to length two chip codes while retaining orthogonality with the first code. Codes which can be fractured into shorter codes are called variable length orthogonal codes.

TABLE 1

Walsh Codes of Length 16

1111111111111111
1111111100000000
1111000011110000
1111000000001111
1100110011001100
1100110000110011
1100001111000011
1100001100111100
1010101010101010
1010101010010101
1010010110100101
1010010101011010
1001100110011001
1001011010010110
1001011001101001

Table 1 shows the complete set of Walsh codes having length 16. In the set of Table 1, every code differs from every other code in exactly half its bit positions. Moreover, the last eight codes may be split into codes of half the length while remaining orthogonal to the first eight codes. When the codes are split, there are only four distinct codes that arise in pairs. These four distinct length-8 codes may also be split into length four codes, of which there are two distinct codes, 1010 and 1001. These are also orthogonal to the first eight codes of the original set of sixteen codes. Finally, these codes may be split to give a single length-2 code 10 which remains orthogonal to the first eight, length-sixteen codes.

Thus, as summarized above, variable-length orthogonal codes are produced by splitting an N×N Walsh-Hadamard code matrix both horizontally and vertically to obtain an N/2×N/2 matrix of half-length codes which are each still orthogonal to the original length-N codes. The splitting process may continue to produce successively shorter codes, capable of carrying successively higher data rates in an orthogonal code-division multiple access system.

There is only one such Walsh-Hadamard code set, so in order to avoid confusion between signals in adjacent base station areas, i.e. cells, the Walsh code set can be differently scrambled for different base stations by combining an overall scrambling code with all members of the set. Such scrambling does not destroy the mutual orthogonality of codes within the set. U.S. Pat. No. 5,550,809 to Bottomley and Dent, incorporated herein by reference, discloses optimum scrambling codes for rendering the scrambled Walsh code sets maximally unlike. When two Walsh sets are so scrambled, no code from one set is the same as any code in a differently scrambled set.

There are other ways to render two orthogonal code sets different however, that allow the differently scrambled sets to contain common codes, if such should have utility in a given application. For example, in a satellite system, it can be advantageous to reserve one code in all beams (cells) to be a pilot code to provide a coherent reference, and it is useful if the pilot code is the same code in all beams so that constructive addition occurs at the edge of two beams rather than inter-beam interference. Another application may be when it is desired to transmit the same signal to the same mobile station from two base stations operating in space diversity.

A technique used herein for scrambling an orthogonal code set while retaining one or more codes in common is to permute columns. With reference to the above code set of length sixteen, it may be seen that the first code comprised only of ones (1) is unchanged under any permutation of columns. Likewise, both the first and the second code remain unchanged under any permutation of the first eight columns and any permutation of the second eight columns. For example, the code set of Table 2 can be obtained by permuting columns (and recording the codes as necessary).

The code set of Table 2 may also be produced by rotating the length-fifteen maximum length sequence 001110110010101 and appending a first row and first column of ones (1). (The usual notation for a maximum length sequence is the complement of this, in which case a column of zeros should be added, obtaining a complementary code set. Either the code set or its complement may be used with equal effect.) Code sets produced by starting with different maximum length sequences are maximally different in all but their common member, the all ones (1) code.

TABLE 2

1111111111111111
1000011101100101
1100001110110010
1010000111011001
1101000011101100
1010100001110110
1001010000111011
1100101000011101
1110010100001110
1011001010000111
1101100101000011
1110110010100001
1111011001010000
1011101100101000
1001110110010100
1000111011001010

It will be realized however that the above variant of the orthogonal code set cannot be split down the middle to produce half-length codes that remain orthogonal, due to there being no longer any guarantee of 50% ones (1) and 50% zeros (0), in the first eight chips. Problematically, therefore these orthogonal code sets do not form variable length orthogonal code sets.

What is needed therefore, and an object of the present invention, are systems and techniques which afford greater choice of orthogonal code sets for minimizing interference between CDMA signals.

SUMMARY

Systems for transmitting information symbols utilize ternary codes or pivot codes in conjunction with spread spectrum encoding. The systems comprise at least a first symbol source for supplying an information signal comprising at least a first stream of I,Q bit pairs, means for using either a ternary code or at least one pivot code for spreading the at least first stream of I,Q bit pairs and thereby respectively forming first chips and second chips, and a radio signal modulator for transmitting the first chips and second chips over a radio interface.

In contrast to the known art, in one of its aspects the current technology uses a more general N×N orthogonal code matrix which is related to a Walsh-Hadamard matrix apart from a scrambling of the order of columns. This more general code matrix is split by choosing as a pivot code any code comprising N/2 number of ones (1) and N/2 number of zeroes (0) and replacing the columns containing one in the pivot code with columns of null symbols to form a first N×N submatrix, and replacing columns containing zero in the pivot code with null symbols to form a second N×N submatrix. Each submatrix thus formed has pairs of identical rows. In order to obtain submatrices in which each row is unique, one of each row pair is deleted from each submatrix to leave a first and a second N/2×N submatrix. Each row of each submatrix contains N/2 non-null symbols and N/2 null symbols, with the null columns of one submatrix occupying the same positions as the non-null columns of the other submatrix.

A first symbol stream may be CDMA encoded by multiplying each symbol with a code from the first matrix and a second symbol stream may be CDMA encoded by multiplying each symbol with a code of the second submatrix, the two encoded signals then being linearly added before transmission.

The technology eliminates the restriction to Walsh Hadamard column ordering, thus allowing greater choice of orthogonal code sets for minimizing interference between CDMA signals in neighboring geographical areas.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, nodes, functional entities, protocols, standards, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor(s) or general purpose computer(s), either distributed or concentrated, and using an application specific integrated circuit (ASIC), and/or using one or more digital signal processors (DSPs).

It is useful to be able to create two or more orthogonal code sets which possess one or more common members, but which otherwise are maximally different. Such code sets can be produced by starting first with a simplex code set, which is produced by writing down all rotations of a maximum length sequence of length $2^N-1$ and then augmenting the code set by appending a column of zeros. Alternatively, as discussed above, the complement of the simplex code set can be used, augmented by a column of ones, using different maximum length sequences produces different code sets which are maximally different from each other apart from the common member. Such code sets can be useful for adjacent cells of a CDMA cellular system or in adjacent beams of a satellite communications system.

While one such code Set can be recast into the Walsh-Hadamard form by column interchange, it is impossible to find a column permutation which will reduce two such code sets to the standard Walsh-Hadamard form, and it is not useful to apply different column permutations to two such code sets, as that would destroy the sought after "maximally different" property.

Thus at least one code set will remain in non-Walsh-Hadamard form and so cannot be split in the prior art manner into shorter codes to allow variable-length orthogonal coding. Therefore it is desired to find a different method to produce shorter but still orthogonal codes that can be used with an orthogonal code set that is not in Walsh-Hadamard format.

Figure 1:
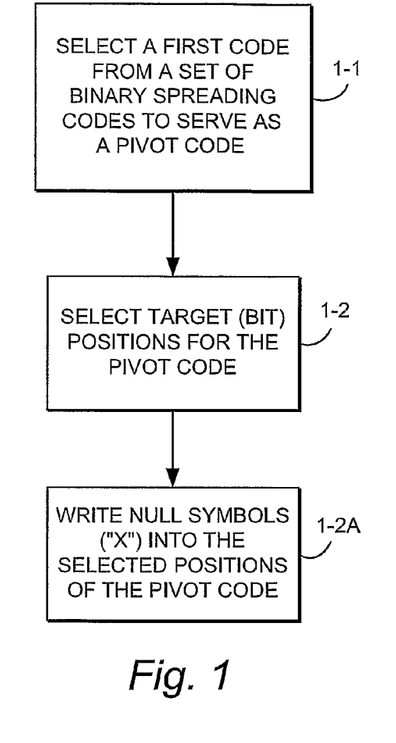
FIG. 1 is a flowchart illustrating basic steps involved in a technique of forming a pivot code pattern.

An exemplary augmented simplex code set (such as that of Table 2) can be used to form a "pivot" code pattern according to a technique having basic steps illustrated in FIG. 1. The technique of FIG. 1 begins by picking any code having eight ones (1) and eight zeroes (0) to be a "pivot" code. In other words, as shown by step 1-1 of FIG. 1, a first code is selected from a set of binary spreading codes to serve as the pivot code. The pivot code has a (preferably equal) non-zero number of members of a first binary value (e.g., one (1)) and non-zero number of members of a second binary value (e.g., zero (0)). The pivot code, being binary, thus has bits which are either of a first binary value (i.e., zero (0)) or a second binary value (i.e., one (1)).

The columns which contain ones in the pivot code are replaced with null symbols (denoted below by "x") to obtain a first set of ternary codes and the columns containing zeros in the pivot codes are replaced with null symbols to obtain a second set of ternary codes. That is, as step 1-2 of the technique of FIG. 1, target (bit) positions are selected for the pivot code, the target positions being either the first binary value (i.e., zero (0)) or the second binary value (i.e., one (1)). As step 1-2A, null symbols ("x") are written into the selected column positions of the pivot code. Accordingly, a pivot code pattern is produced which has null values in its target positions, and the (unselected, untargeted) binary values in its remaining positions.

For example, if the second code listed in the code set of Table 2 is selected as the pivot code, and positions having the binary value "0" are selected for the target positions, then the resulting pivot code pattern is as follows: 1xxxx111x11xx1x1. On the other hand, if the second code listed in the code set of Table 2 is selected as the pivot code, and positions having the binary value "1" are selected for the target positions, then the resulting pivot code pattern is as follows: x0000xxx0xx00x0x.

Figure 2:
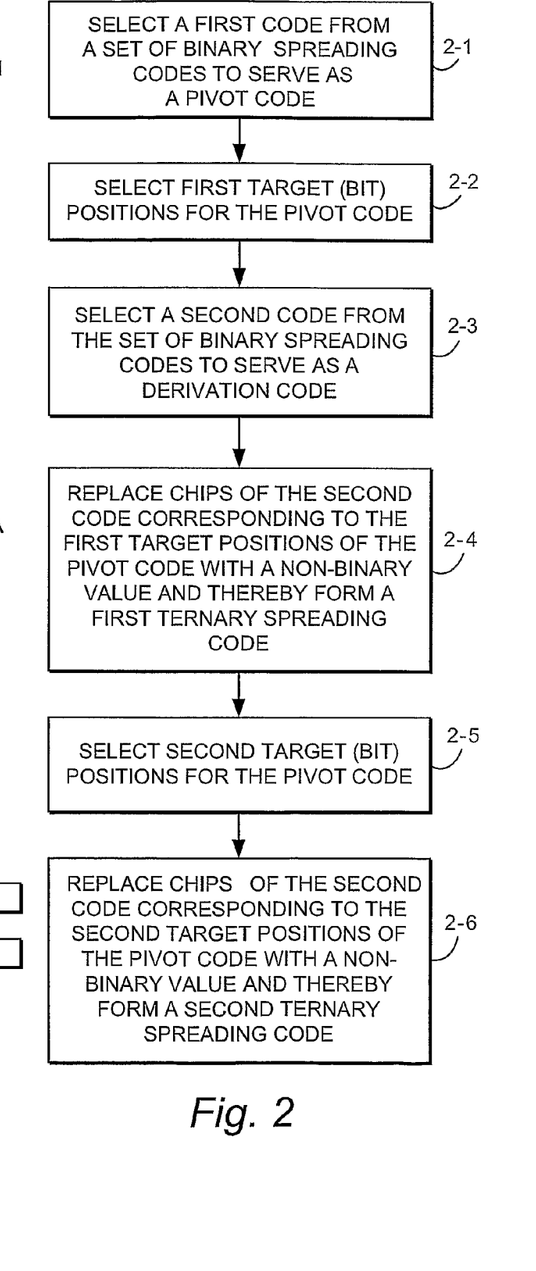
FIG. 2 is a flowchart illustrating basic steps involved in a technique of forming a ternary (separated) code (subcode).

An exemplary augmented simplex code set (such as that of Table 2) can also be separated into two sub-codes by a technique including basic steps illustrated in FIG. 2. The technique of forming sub-codes begins essentially in the same manner as the technique of FIG. 1, e.g., performing step 2-1 and step 2-2 which are essentially the same as step 1-1 and step 1-2 of FIG. 1, respectively. Performance of step 2-1 involves selecting the pivot code (like step 1-1). Step 2-2 involves selecting first target (bit) positions for the pivot code, the first target positions being either the first binary value (i.e., zero (0)) or the second binary value (i.e., one (1)). For sake of discussion, it will be assumed that zero valued positions are chosen as the first target positions.

As explained subsequently, step 2-3 of the technique of FIG. 1 involves selecting a second code from the set of binary spreading codes (e.g., the code set of Table 2) to serve as a derivation code. So as not to be prematurely restrictive regarding derivation codes in explaining the technique, insofar as Table 3 is concerned the ensuing discussion caters for any of the codes of the code set of Table 2 as being the derivation code.

Step 2-4 of the technique of FIG. 2 involves replacing chips of the second code (i.e., the derivation code) corresponding to the first target positions of the pivot code with a non-binary value (e.g., the null value ("x") and thereby forming a first ternary spreading code (e.g., a first "separated" or sub-code).

If a second ternary spreading code is to be formed from the derivation code, steps 2-5 and 2-6 of FIG. 2 can be performed. Step 2-5 involves selecting second target (bit) positions for the pivot code, the second target positions being the bit positions not chosen in step 2-2 (for sake of the same discussion, the one (1) value positions are chosen as the second target positions). Step 2-6 of the technique of FIG. 2 involves replacing chips of the second code (i.e., the derivation code) corresponding to the second target positions of the pivot code with a non-binary value (e.g., the null value ("x") and thereby forming a second ternary spreading code (e.g., a second "separated" or sub-code).

For example, using the second code (e.g., code 1000111101100101) in the set of Table 2 as the pivot code, the technique of FIG. 2 results in the two "separated" code sets shown in the second and third table columns of Table 3. The first table column of Table 3 lists the codes of the code set of Table 2. The first separated code set of Table 3 (the codes of the code set of second table column of Table 3) are formed by writing null symbols in the second code (e.g., code 1000111101100101) corresponding to the position of zero symbols in the pivot code in accordance with steps 2-2 and 2-4, while the second separated code set of Table 3 (the codes of the code set of third table column of Table 3) are formed by writing null symbols in the positions of the second code corresponding to the position of non-zero symbols in the pivot code in accordance with steps 2-5 and 2-6.

TABLE 3

| | | |
|---|---|---|
| 1111111111111111 | 1xxxx111x11xx1x1 | x1111xxx1xx11x1x |
| 1000111101100101 | 1xxxx111x11xx1x1 | x0000xxx0xx00x0x |
| 1100001110110010 | 1xxxx011x01xx0x0 | x1000xxx1xx10x1x |
| 1010000111011001 | 1xxxx001x10xx0x1 | x0100xxx1xx11x0x |
| 1101000011101100 | 1xxxx000x11xx1x0 | x1010xxx1xx01x0x |

TABLE 3-continued

| | | |
|---|---|---|
| 1010100001110110 | 1xxxx000x11xx1x0 | x0101xxx0xx10x0x |
| 1001010000111011 | 1xxxx100x01xx0x1 | x0010xxx0xx11x1x |
| 1100101000011101 | 1xxxx010x00xx1x1 | x1001xxx0xx11x0x |
| 1110010100001110 | 1xxxx101x00xx1x0 | x1100xxx0xx01x1x |
| 1011001010000111 | 1xxxx010x00xx1x1 | x0110xxx1xx00x1x |
| 1101100101000011 | 1xxxx001x10xx0x1 | x1011xxx0xx00x1x |
| 1110110010100001 | 1xxxx100x01xx1x1 | x1101xxx1xx00x0x |
| 1111011001010000 | 1xxxx110x10xx0x0 | x1110xxx0xx10x0x |
| 1011101100101000 | 1xxxx001x01xx0x0 | x0111xxx0xx01x0x |
| 1001110110010100 | 1xxxx101x00xx1x0 | x0011xxx1xx10x0x |
| 1000111011001010 | 1xxxx110x10xx0x0 | x0001xxx1xx01x1x |

It will be seen from Table 3 that separated codes occur in pairs or complementary pairs. For example, the separated code in the second column for the original code of the second row (e.g., code 1000111101100101) is the same as (and thus duplicates) the separated code in the second column for the original code 1011101100101000. Eliminating one of each pair (e.g., the complementary or duplicate of each pair) results in the separated codes of Table 4. Table 4 shows the original codes ("C" codes), as well as the two resulting separated (ternary) codes for the surviving original codes. In Table 4, a first resulting separated code for each surviving original code is referred the "A" code and a second resulting separated code for each surviving original code is referred the "B" code. Thus, as shown in Table 4, eight unique codes remain in each of the separated code sets. The pairs of eight unique codes are numbered as pairs 0-7 as reflected by the last table column of Table 4.

TABLE 4

| | ORIGINAL CODES C | SEPARATED CODE A | SEPARATED CODE B | |
|---|---|---|---|---|
| 0 | 1111111111111111 | 1xxxx111x11xx1x1 | x1111xxx1xx11x1x | 0 |
| 1 | 1000011101100101 | | | |
| 2 | 1000111101100101 | 1xxxx011x01xx0x0 | x1000xxx1xx10x1x | 1 |
| 3 | 1010000111011001 | 1xxxx001x10xx0x1 | x0100xxx1xx11x0x | 2 |
| 4 | 1101000011101100 | 1xxxx000x11xx1x0 | x1010xxx1xx01x0x | 3 |
| 5 | 1010100001110110 | | | |
| 6 | 1001010000111011 | 1xxxx100x01xx1x1 | x0010xxx0xx11x1x | 4 |
| 7 | 1100101000011101 | 1xxxx010x00xx1x1 | x1001xxx0xx11x0x | 5 |
| 8 | 1110010100001110 | 1xxxx101x00xx1x | x1100xxx0xx01x1x | 6 |
| 9 | 1011001010000111 | | | |
| a | 1101100101000011 | | | |
| b | 1110110010100001 | | | |
| c | 1111011001010000 | 1xxxx110x10xx0x0 | x1110xxx0xx10x0x | 7 |
| d | 1011101100101000 | | | |
| e | 1001110110010100 | | | |
| f | 1000111011001010 | | | |

As explained previously, the x's in the above notation signify that no symbol (or a null symbol) exists in that location, while the ones (1) and zeroes (0) signify binary bits in Boolean notation. When such a code is converted to a signal for transmission, the signal value +1 may be used for a Boolean 0; the signal level −1 used for a Boolean 1, and the signal level zero used for the x's or null symbols. The correlation between any two of the separated codes is obtained by multiplying corresponding symbols and adding the products, using the logic of Table 5.

TABLE 5

| BOOLEAN | ARITHMETIC |
|---|---|
| 1 times 1 = | +1 |
| 1 times 0 = | −1 |
| x time 1, 0 or x = | 0 |

It may be determined that the sixteen separated codes are all mutually orthogonal, in that the above-defined sum-of-products is zero for all pairs of codes. A separated code is also orthogonal to all of the original codes except the code from which it was separated and one other. This pair of original codes may thus be replaced by a pair of separated codes (Ai,Bi) while preserving a mutually orthogonal set of sixteen codes, the separated pair now however being ternary codes including null symbols.

The pair of separated codes may now be used to spread two data symbols D1 and D2, such as by forming D1(Ai)+D2(Bi), where Ai and Bi are the ternary code vectors. For example using the 5th separated code pair of Table 4, i.e., A5 (1xxxx010x00xx1x1) and B5 (x1001xxx0xx11x0x) yields the following 16-chip sequence:

−D1 −D2 D2 D2 −D2 D1 −D1 D1 D2 D1 D1 −D2 −D2 −D1 D2 −D2

An alternative way to encode twice the datarate is to use one of the original codes (C7) to spread D1 and the other (C9) to encode D2, where C7 and C9 are the code pair replaced by A5 and B5. The two spread-spectrum encoded signals are then linearly added. This is called the "multicode" approach to obtaining higher datarates.

The difference between using A5 and B5 and using the two original codes C7 and C9 is that, when using the inventive codes A5, B5, the resulting chip values are now just equal to the symbol values D1 and D2 or their inverses instead of being the multi-level values +/−D1+/−D2 that would arise if C7 and C9 were used. Thus the new method avoids multi-valued signal values that arise with the multicode approach, simplifying transmit signal generation. Moreover, the despreading process at the receiver correlates the received signal with the separated ternary codes A5 and B5 which have of 50% null symbols, for which multiplications do not need to be performed. Thus the receiver is simpler.

The difference between the inventive approach and the prior art variable-length orthogonal coding approach is that the prior art approach would yield a chip sequence such as

D1 −D1 −D1 D1 −D1 D1 D1 −D1 −D2 D2 D2 −D2 D2 −D2 −D2 D2 in which the D1 and D2 valued chips are not interleaved. The interleaving of the D1 and D2-valued chips when using the present technology arises essentially from the permutation of the columns of the code set, which mixes chips of the second half of the code with chips of the first half of the code. When in addition an overall complex scrambling code is applied to the above sequences, each successive chip is uncorrelated with the previous ones and the spectrum is thus indistinguishable between the interleaved and the non-interleaved sequences. The current invention may in principle be produced by employing a system using the prior art Walsh-Hadamard variable length orthogonal codes, and then applying an interleaving process to the resulting chip sequence. However, this is not the preferred method, as applying an interleaving process to a high chiprate stream involves more onerous processing.

Yet another way of achieving the same result as the above is to form the sum D1+D2 of two symbols and their difference D1−D2. The sum stream is then multiplicatively combined with a first spreading code and added to the difference stream multiplicatively combined with a second spreading code orthogonal to the first spreading code. The result is that, in bit positions where the first and second spreading codes agree, (D1+D2)+(D1−D2)=2D1 will be transmitted, while where the bits of the first and second code disagree, 2D2 will be transmitted. Thus the appearance of multilevel symbols in this multicode approach is avoided by precombining the symbols such that the additive combination of the multicodes undoes the precombination.

Figure 3:
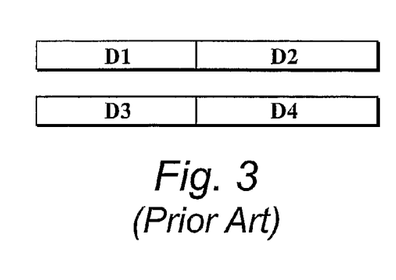
FIG. 3 is a diagrammatic view of a prior art overlap of coded symbols.

Another difference in the new technique is that the interference from a transmitter using a different code set to one of the A or B separated codes depends on more than one data symbol of the interfering transmitter. When using prior art split codes, the interference depends on only one symbol, as may be seen in FIG. 3. In FIG. 3, the coded symbol D1 transmitted by one transmitter overlaps only the coded symbol D3 transmitted by the second transmitter, and likewise D2 is only overlapped by D4. When the multicode approach is used, on the otherhand, D1 and D2 are overlapped by both D3 and D4, so there is more interference diversity. The prior art multicode method therefore provides more interferer diversity than the prior art variable length orthogonal coding method. When using the current invention, D1 is distributed by the column interleaving in a different way than D3 and D4, so the chips carrying D1 no longer coincide only with chips carrying D3 or D4 alone, but some of each, thus obtaining the desirable interference diversity of the prior art multicode method but without its disadvantages of multi-level chip values and more onerous receive processing.

It may be seen that each separated code except index 0 has half of its contents as ones and half of its contents as zeroes (i.e., contains 50% ones and 50% zeros) Accordingly, the process of separation into two codes, each having half the number of non-null symbols, can he repeated to form doubly-separated codes by choosing one of the separated codes (such as those of Table 4) other than index 0 to be a new pivot, e.g., a new pivot code, also known as a secondary pivot code.

If the secondary pivot code is an "A" code, the resulting doubly-separated codes will be orthogonal to all the "B" codes but not orthogonal to the pivot and one other A code, which are therefore deleted in favor of the two new doubly-separated codes. Table 6 shows how doubly-separated codes can be formed from the separated codes of Table 4 when, for example, code B3 of Table 4 (i.e., x1010xxx1xx01x0x) is chosen as the secondary pivot. In Table 6, the notation "code BA" and "code BB" indicates that the two new codes have been derived from code B. Had two doubly-separated codes been derived from an A-code secondary pivot instead, they would be denoted AA and AB.

TABLE 6

| | SEPARATED CODE A | SEPARATED CODE B | SEPARATED CODE BA | SEPARATED CODE BB |
|---|---|---|---|---|
| 0 | 1xxxx111x11xx1x1 | x1111xxx1xx11x1x | x1x1xxxx1xxx1xxx | xx1x1xxxxxx1xx1x |
| 1 | 1xxxx011x01xx0x0 | x1000xxx1xx10x1x | x1x0xxxx1xxx0xxx | xx0x0xxxxxx1xx1x |
| 2 | 1xxxx001x10xxox1 | x0100xxx1xx11x0x | x0x0xxxx1xxx1xxx | xx1xoxxxxxx1xx0x |
| 3 | 1xxxx000x11xx1x0 | x1010xxx1xx01x0x | x1x1xxxx1xxx1xxx | xx0x0xxxxxx0xx0x |
| 4 | 1xxxx100x01xx0x1 | x0010xxx0xx11x1x | x0x1xxxxcxxx1xxx | xx0x0xxxxxx1xx1x |
| 5 | 1xxxx010x00xx1x1 | x1001xxx0xx11x0x | x1x0xxxx0xxx1xxx | xx0x1xxxxxx1xx0x |
| 6 | 1xxxx101x00xx1x0 | x1100xxx0xx01x1x | x1x0xxxx0xx01xxx | xx1x0xxxxxx0xx1x |
| 7 | 1xxxx110x10xx0x0 | x1110xxx0xx10x0x | x1x1xxxx0xxx0xxx | xx1x0xxxxxx1xxex |

By eliminating one of each pair or complementary pair of BA or BB of codes in Table 6, there remain 4 unique BA codes and 4 unique BB codes as shown in Table 7.

TABLE 7

| | SEPARATED CODE A | SEPARATED CODE B | SEPARATED CODE BA | SEPARATED CODE BB | |
|---|---|---|---|---|---|
| 0 | 1xxxx111x11xx1x1 | x1111xxx1xx11x1x | x1x1xxxx1xxx1xxx | xx1x1xxxxxx1xx1x | 0 |
| 1 | 1xxxx011x01xx0x0 | x1000xxx1xx10x1x | x1x0xxxx1xxx0xxx | xx0x0xxxxxx1xx1x | 1 |
| 2 | 1xxxx001x10xxox1 | x0100xxx1xx11x0x | x0x0xxxx1xxx1xxx | xx1xoxxxxxx1xx0x | 2 |
| 3 | 1xxxx000x11xx1x0 | x1010xxx1xx01x0x | | | |
| 4 | 1xxxx100x01xx0x1 | x0010xxx0xx11x1x | | | |
| 5 | 1xxxx010x00xx1x1 | x1001xxx0xx11x0x | x1x0xxxx0xxx1xxx | xx0x1xxxxxx1xx0x | 3 |
| 6 | 1xxxx101x00xx1x0 | x1100xxx0xx01x1x | | | |
| 7 | 1xxxx110x10xx0x0 | x1110xxx0xx10x0x | | | |

If, for example, code B5 of Table 4 (x1001xxx0xx11x0x) were separated as indicated into two codes BA3 and BB3, all of the A codes may still be used as they are orthogonal to the BA and BB codes, but use of the original B5 code must be foregone as must use of code B6 which is not orthogonal to BA3 and BB3. Thus two of the B codes are replaced by two of the doubly-separated codes. Either the corresponding A code A3 may also be separated into two new codes AA and AB, or a different A code or a different doubly-separated B code may be used to obtain four doubly-separated codes with which to spread four data symbols D1, D2, D3, D4 thus allowing a quadrupling of the transmitted datarate. If a doubly separated A code is used to obtain AA and AB, a different A code can be chosen as the pivot, i.e., it does not have to be the A code A3 corresponding to the pivot B3. On the other hand if two pairs of doubly separated B codes are used to encode D1, D2, D3 and D4, they must be obtained by use of the same pivot in order to obtain orthogonal codes.

Figure 4:
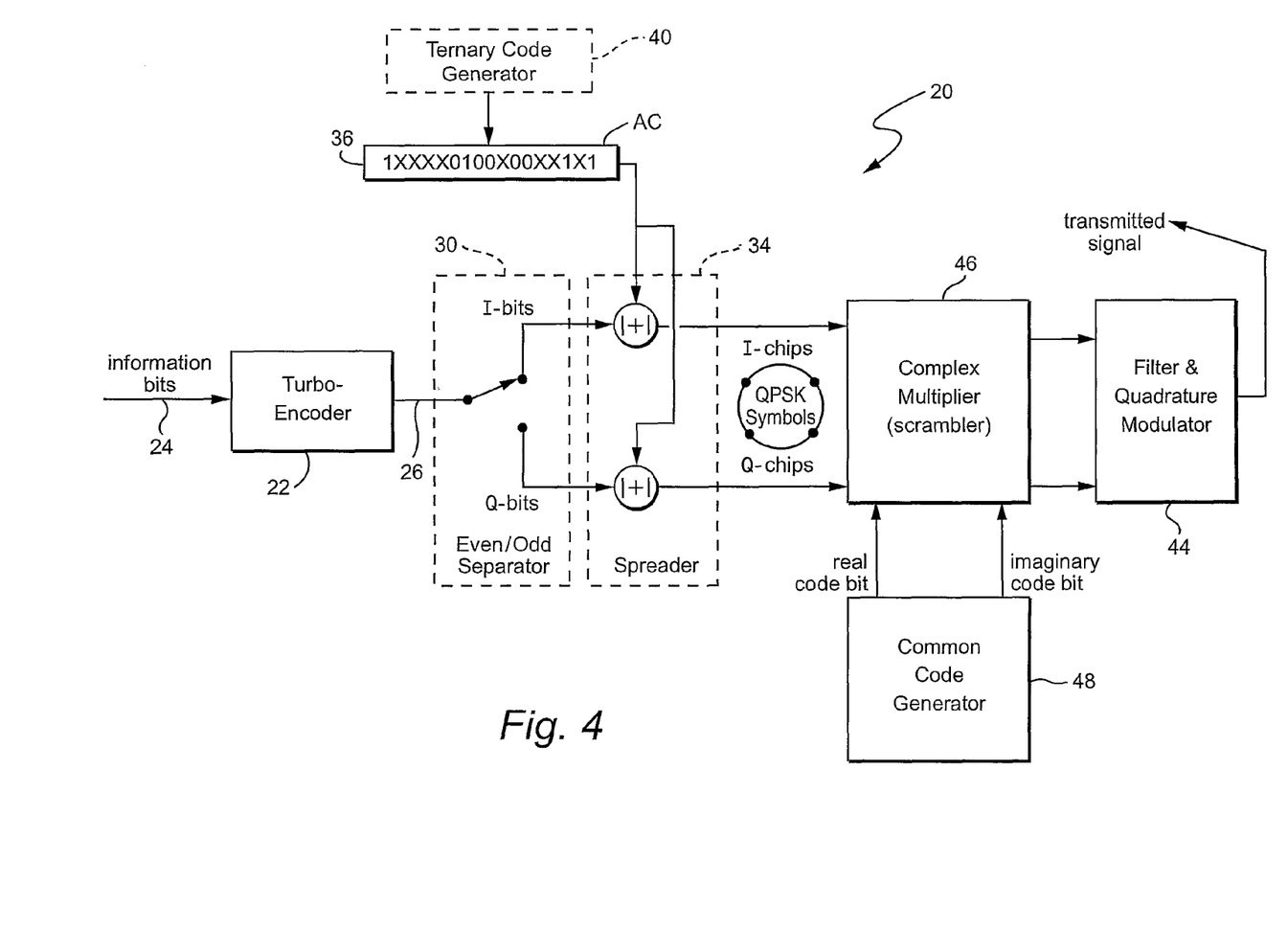
FIG. 4 is a diagrammatic view of an example embodiment of a CDMA transmission system.

FIG. 4 illustrates a CDMA transmitting system 20 according to a first example embodiment and suitable for implementing techniques including those described above. The particular example system of FIG. 4 uses QPSK modulation, which is a four-phase modulation conveying two bits per information symbol. In FIG. 4, information bits enter a turbo-encoder 22 as shown by arrow 24. The turbo-encoder 22 performs such example operations as error correction coding and interleaving and outputs coded bits (on line 26) in an interleaved order. The number of coded bits is greater than the number of information bits by a factor in the region of two to four, reflecting the rate of the code.

At a selecting means or switch 30, the coded bits output from turbo-encoder 22 are separated into two streams. Such separation by switch 20 can occur, for example, by directing even-numbered bits to one path and odd-numbered bits to another path, i.e., I-bits to one path and Q-bits to another path. At spreader 34 each of the even or odd bits is then expanded by a CDMA spreading factor by combining them with the assigned ternary code to provide a greater number of chips per second, some of which are null chips having a zero amplitude corresponding to the x's in the assigned code. The assigned code utilized by spreader 34 is a ternary code generated in accordance with techniques such as those previously described, e.g., with reference to FIG. 2. FIG. 4 shows the assigned ternary code as being stored in a memory or register 36. The assigned code, i.e., the contents of register 36, is hereinafter also referred to as assigned code AC. The same assigned code AC is used to spread both the I and Q bits.

The assigned ternary code (AC) in register 36 can be pre-stored therein or alternatively (and optionally) generated by ternary code generator 40. The ternary code generator 40 can comprise any suitable structure for generating one or more ternary codes in accordance with techniques such as those described previously by way of example with reference to FIG. 2. Such structure can comprise individual hardware circuits, using software functioning in conjunction with a suitably programmed digital microprocessor(s) or general purpose computer(s), either distributed or concentrated, and using an application specific integrated circuit (ASIC), and/or using one or more digital signal processors (DSPs). In generating such ternary code(s), the ternary code generator 40 can utilize inputs such as choice of pivot code, choice of derivation code, and the like.

The even and odd (I and Q) bits and the corresponding even and odd (I and Q) chips produced by spreader 34 using assigned code AC in register 36 are directed to be transmitted using the cosine and sine or "I and 0" channels of a complex radio signal modulator 44, and so may thus be called "I-bits, Q-bits" and "I-chips, Q-chips" respectively. A pair of bits comprising an I-bit and a Q-bit, if the bit periods are synchronized, comprises a QPSK symbol as is well known in art, and a pair of I,Q chips comprises a QPSK symbol at the CDMA spread rate.

The I-chips will be filtered before modulating a cosine radio carrier signal and the Q-chips will be filtered before modulating a sine carrier signal, this being performed by quadrature modulator 44. Prior to modulation in modulator 44, however, the (I-chip,Q-chip) stream is scrambled by scrambler 46. Scrambler 46 performs scrambling by rotating the phase of the QPSK symbol or complex number it represents through either 0, 90, 180, or 270 degrees by complex-multiplication with a pseudorandom QPSK symbol stream from an I,Q code generator 48. This scrambling code is common to different signals transmitted by the same cell transmitter, and may also be common to different cells when different assigned code sets (AC) are used to distinguish the signals transmitted in different cells. The use of a common scrambling code ensures that the mutual orthogonality of different signals in the same cell is undisturbed, and that the cross-correlation between different cell signals is substantially determined by the choice of code sets (AC).

A multi-signal transmitter for a cellular base station is usually formed by adding the output of many scramblers 46 prior to filtering and modulating the sum signals using a common filter/modulator 44. In the case of a multi-signal satellite communications transmission system, the outputs of many complex scramblers may be applied to a beamformer to generate satellite antenna array element drive signals for forming beams in different directions for each signal using the plurality of array elements, the plurality of drive signals then being preferably quadrature time-multiplexed before filtering and upconverting in a corresponding plurality of filter-modulators.

Thus, the CDMA transmitting system 20 of FIG. 4 comprises at least a first symbol source (22, 30) for supplying an information signal comprising at least a first stream of I,Q bit pairs; means (including spreader 34) for using a ternary spreading code to spread bits of the first bit stream and the second bit stream and thereby respectively forming first chips and second chips; and, means (e.g., modulator 44) for using radio signal modulation for transmitting the first chips and second chips over a radio interface.

Figure 5:
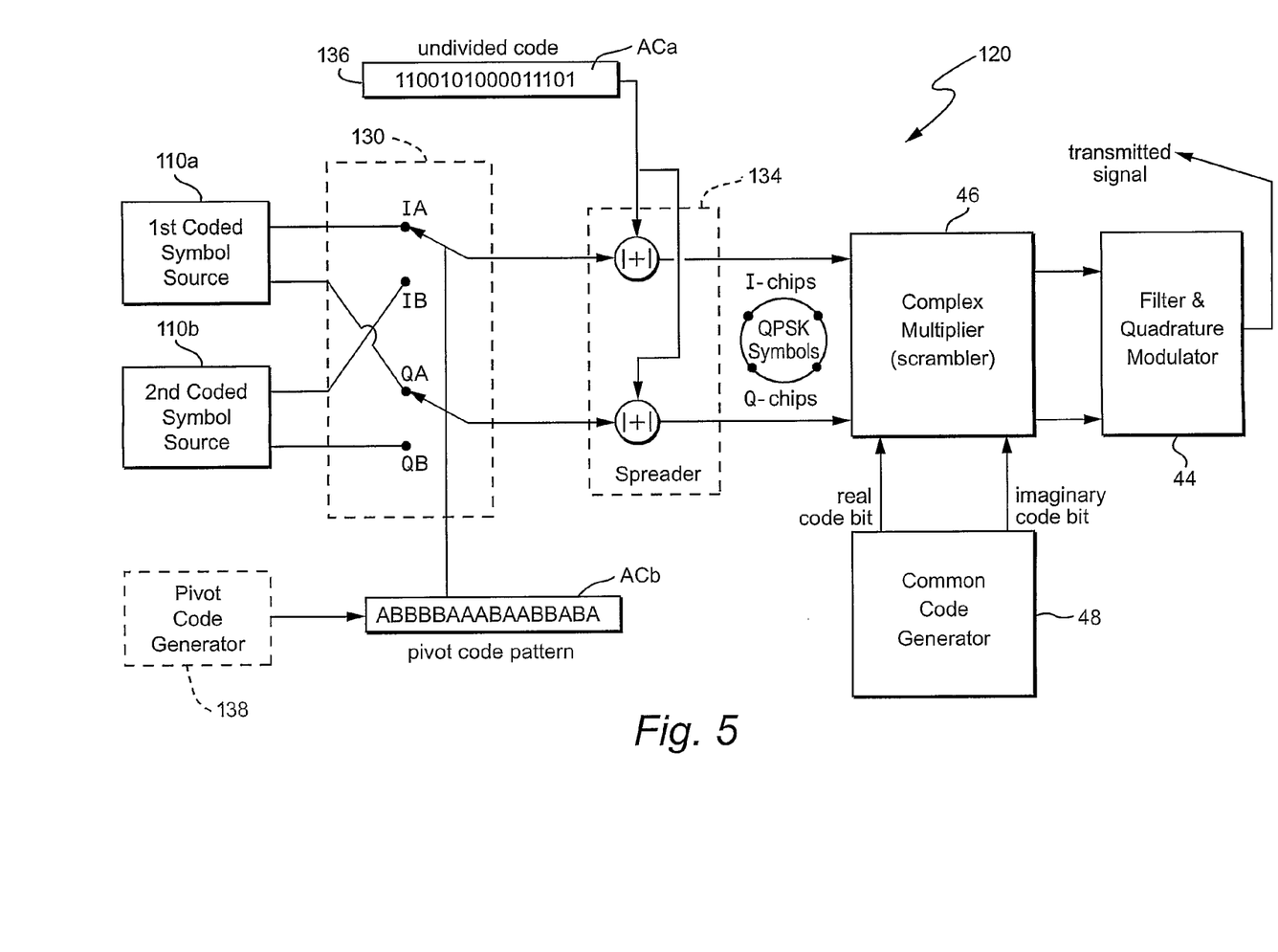
FIG. 5 is a diagrammatic view of another example embodiment of a CDMA transmission system.

FIG. 5 illustrates another example embodiment of a CDMA transmitting system 120 suitable for implementing techniques described herein. In FIG. 5, a first coded information symbol source 110a produces I,Q bit pairs (IA,QA) for CDMA encoding using a first split-code according to the technology described herein. A second coded symbol source 110b produces a second stream of I,Q bit pairs (IB,QB). Sources (110a, 110b) may each correspond to the turbo encode 22 and even/odd separator 30 of FIG. 4.

Alternatively the sources 110a, 110b may equate to a single source which supplies half its bits (IA,QA) on one output and half on another output (IB,QB). Thus the arrangement of FIG. 5 illustrates how either two basic data-rate signals may be transmitted or alternatively one double-rate signal.

In FIG. 5, the whole (unsplit) orthogonal code (ACa, stored, for example, in register 136)) is applied to the CDMA spreader 134. However, corresponding to where there were x's in code (AC) of FIG. 4, the switches 130 will be toggled from position A to position B, so that the first coded symbol source output symbols are selected where there are non-null chips in code (AC), thereby spread-spectrum encoding symbols IA,QA with the "A" split of the full orthogonal code (ACa), and the second coded symbol source symbols are selected where there are null-chips in code (AC), thereby spread-spectrum encoding symbols (IB,QB) with the B-split of code (ACa). Recalling that the split into an A and a B code is determined by the locations of ones or zeroes respectively in the chosen pivot code, the pivot code pattern (ACb) is applied to the control input of selector switches 130 simultaneously with supplying the undivided code (ACa) to the spreader 134. The pivot code pattern (ACb) is shown in FIG. 5 as being stored or pre-stored in a register or alternatively (and optionally) generated by pivot code generator 138. The pivot code generator 138 can comprise any suitable structure for generating a pivot code in accordance with techniques such as those described previously by way of example with reference to FIG. 1. Such structure can comprise individual hardware circuits, using software functioning in conjunction with a suitably programmed digital microprocessor(s) or general purpose computer(s), either distributed or concentrated, and using an application specific integrated circuit (ASIC), and/or using one or more digital signal processors (DSPs).

Thus, the CDMA transmitting system 120 of FIG. 5 comprises a first symbol source 110a for supplying an information signal comprising at least a first stream of I,Q bit pairs and a second symbol source 110b for supplying a second stream of I,Q bit pairs; means (including switches 130 and spreader 134) for using a pivot code to spread bits of the first bit stream and the second bit stream and thereby respectively forming first chips and second chips; and, means (e.g., modulator 44) for using radio signal modulation for transmitting the first chips and second chips over a radio interface. In an example implementation, the spreading means comprises a switch or selector (130c) for selecting between I,Q bit pairs of the first stream and the second stream in dependence upon a pattern of the at least one pivot code (ACb) and for applying selected bits of the first stream and the second stream to the spreader If the pivot code pattern ACb of system 120 of FIG. 5 is set to all ones, i.e., all A's, then only coded symbol source 110a will be selected to be spread with all sixteen chips of code ACa. Thus the arrangement of FIG. 5 can operate in any of the following 3 modes (as, e.g., alternative modes):
 (i) Spreading a single symbol source by a factor of 16
 (ii) Spreading two symbol sources by a factor of 8 using split codes
 (iii) Spreading a single source of double the data rate by a factor of 8 using the split-codes.

Figure 6:
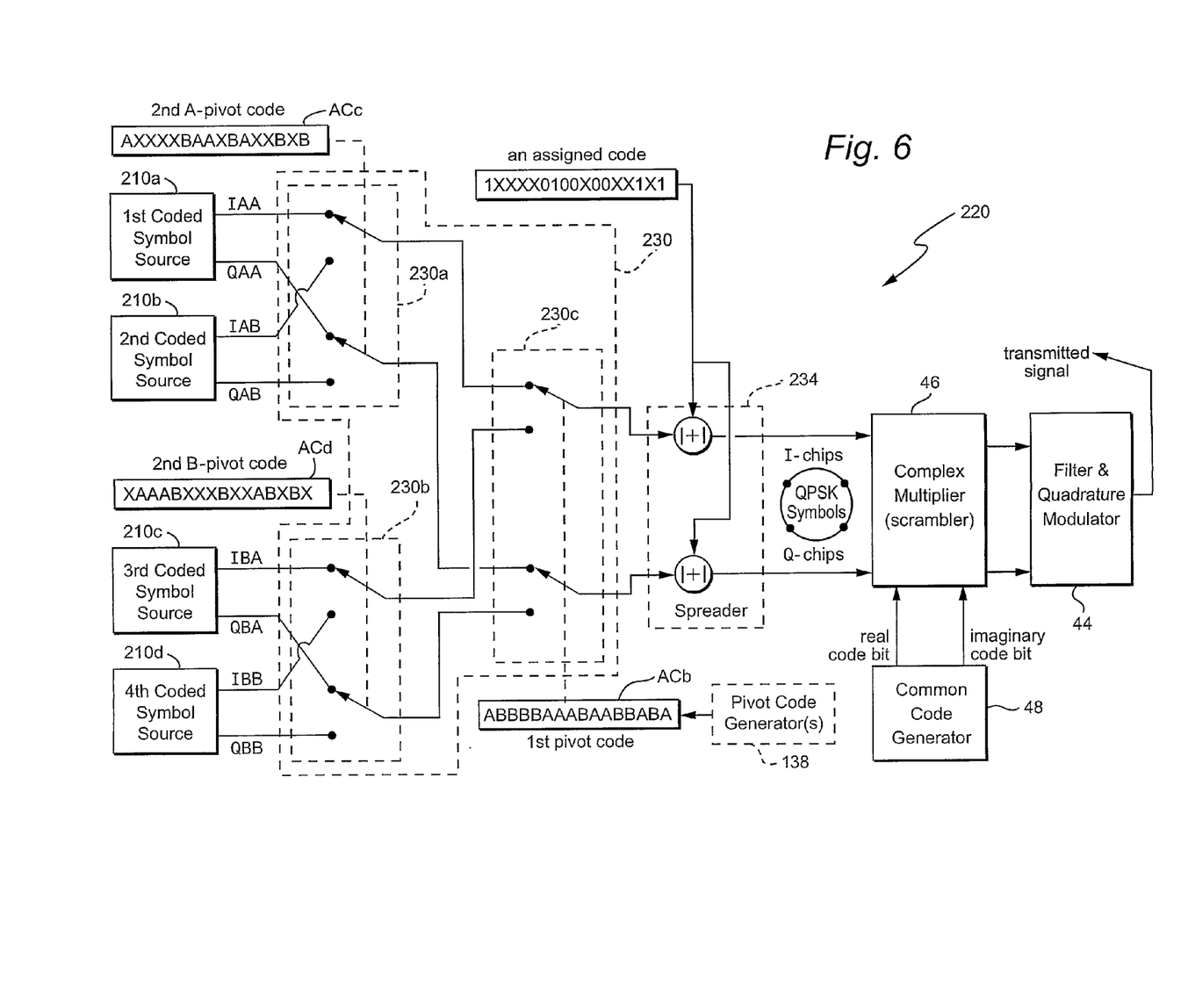
FIG. 6 is a diagrammatic view of yet another example embodiment of a CDMA transmission system.

As shown by the system 220 of FIG. 6, the system 120 of FIG. 5 may be readily extended to the use of four doubly-split codes, by using a four-way selector switch system 230. Switch system 230 has a two-bit control input, the two bits being corresponding bits of the first pivot code (ACb) used for deriving the first code split, and a second pivot code chosen to provide the second code split. FIG. 6 shows the arrangement of a four-way selector 230 for the case where a different pivot code ACd is selected to split the first B-split code into BB and BA codes as compared with the pivot code ACc used to split the A-split code into AA and AB codes. The pivot code ACc and pivot code ACd may be generated using the same pivot code generator 138 which generates the pivot code ACb, or other generator(s) which generating a pivot code in accordance with techniques such as those described previously by way of example with reference to FIG. 1.

The pivot code (ACb) used to effect the first code-split is applied to selector 230c to determine whether a symbol encoded with a code derived from an A-code or a symbol encoded with a code derived from a B-code is selected. If the former, the symbol will be selected by selector 230a. Selector 230a is controlled by the A-split pivot code (Acc) which is selected to be the second pivot for deriving doubly-split codes AA and AB. If the latter, the symbol will be selected by selector 230b, which is controlled by the B-split pivot code (ACd) selected to be the second pivot for deriving doubly-split code BA and BB.

Thus with the arrangement of FIG. 6, the second pivots (i.e., the secondary pivot codes) can be different for the A code branch and the B code branch. As previously explained, in positions in which the second pivots contain X's signifies a "don't care" or null value, as the first pivot code deselects the selector 230a or 230b in these bit positions. Thus the X's may be filled in with the other bits from the original unsplit codes from which they were derived, i.e., second pivot code ACc can be original code 2 and the second pivot code ACd can be original code c. Thus all pivot codes applied to selectors 230a, 230b and 230c may be binary as opposed to ternary codes. Likewise, the output stream to spreader 234 is spread with a full binary orthogonal code selected from the set (0, 2, 3, 4, 6, 7, 8, c) except for the pivot codes. A further degree of freedom is to select a first spreading code when selector 230c is in the "A" position, in which case only the second A-pivot code must be excluded, and a second spreading code when selector 230c is in the "B" position, in which case only the second B-pivot code need be excluded.

Some of the foregoing can be expressed in another way: at each chip interval, one of a number of coded information symbol sources is selected to be combined with a spreading code, scrambled, and transmitted. If all the information sources are of the same datarate, each symbol from each data source will be selected an equal number of times corresponding to the spreading factor. If each data source is not the same data rate, the number of times each symbol will be selected will correspond to the individual spreading factor of that data source. The selection among $2^N$ data sources is controlled by the bits of at least N pivot codes. A corresponding bit from each of the N pivot codes, which must all be different and mutually orthogonal, forms the N-bit control input to a $2^N$-way selector tree. The choice of the pivot codes defines the order in which the different data sources will be selected and reselected for a determined number of repeats of each data symbol.

Another implementation is the use of a $2^N$-way selector that is programmed to select among its input sequentially. A data symbol from a particular source is then applied to a number of inputs corresponding to the spreading factor for that data source. Moreover, the inputs used are not necessarily sequential, but correspond to the instants at which the data symbol would be reselected by the other implementations of the invention, such as that of as FIG. 6.

The four coded symbol sources (110a, 110b, 110c, and 110d) of FIG. 6 may be four independent information streams, or alternatively may each represent one fourth of the output symbols of a quadruple-rate information symbol stream.

The arrangement may be expended by a person skilled in the art to higher order binary selector trees to obtain other data rates in steps of a power of two.

The arrangement may also be used with modulation symbols of higher order than QPSK. In that case, a value-pair such as (IAA,QAA) denotes the complex coordinates of a constellation point in the complex plane assigned to represent a symbol in the higher-order alphabet.

The above principles may also be extended to the use of other than binary orthogonal codes, such as Fourier sequences or hybrid Walsh-Fourier sequences. Such code sets also remain mutually orthogonal under column permutations, different permutations being used to produce distinct sets. Such codes are not restricted to being a power of two long, but the length must not be prime if it is desired to split such codes into derived sets. For example, a Fourier code set of length fifteen may be split into either three sets of spreading factor 5 or five sets of spreading factor 3, but a code set of length seventeen may not be split in a meaningful way.

The method of deriving lower spreading factor codes from higher spreading factor codes by splitting a first higher spreading factor code according to the chip values of a second higher spreading-factor code can in principle be executed whether the code set is an orthogonal code set or not. Of course if the code set is not orthogonal, then the derived split codes are not guaranteed to be orthogonal either; non-orthogonal codes are however sometimes useful in CDMA systems.

This technology allows non-Walsh-Hadamard orthogonal code sets to be used as variable length codes. In contrast to the known art, the current technology uses a more general N×N orthogonal code matrix which is related to a Walsh-Hadamard matrix apart from a scrambling of the order of columns. This more general code matrix is split by choosing as a pivot code any code comprising N/2 number of ones (1) and N/2 number of zeroes (0) and replacing the columns containing one in the pivot code with columns of null symbols to form a first N×N submatrix, and replacing columns containing zero in the pivot code with null symbols to form a second N×N submatrix. Each submatrix thus formed has pairs of identical rows. In order to obtain submatrices in which each row is unique, one of each row pair is deleted from each submatrix to leave a first and a second N/2×N submatrix. Each row of each submatrix contains N/2 non-null symbols and N/2 null symbols, with the null columns of one submatrix occupying the same positions as the non-null columns of the other submatrix. A first symbol stream may be CDMA encoded by multiplying each symbol with a code from the first matrix and a second symbol stream may be CDMA encoded by multiplying each symbol with a code of the second submatrix, the two encoded signals then being linearly added before transmission.

The technology described herein eliminates the restriction to Walsh Hadamard column ordering, thus allowing greater choice of orthogonal code sets for minimizing interference between CDMA signals in neighboring geographical areas.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

What is claimed is:

1. A method of generating a ternary code for use in spreading an information signal, the method comprising:
    using a processor to select a first code from a set of binary spreading codes to serve as a pivot code, the pivot code having non-zero number of members of a first binary value and non-zero number of members of a second binary value;
    using the processor to select positions of the pivot code having one of the first binary value and the second binary value to serve as first target positions;
    using the processor to select a second code from the set of binary spreading codes to serve as a derivation code;
    using the processor to replace chips of the second code corresponding to the first target positions of the pivot code with a non-binary value and thereby forming a first ternary spreading code.

2. The method of claim 1, further comprising using the processor to:
    select positions of the pivot code having another of the first binary value and the second binary value to serve as second target positions;
    replace chips of the second code corresponding to the second target positions of the pivot code with a non-binary value and thereby forming a second ternary spreading code.

3. A method of spreading an information signal comprising:
    using an processor to select a first code from a set of binary spreading codes to serve as a pivot code, the pivot code having an equal non-zero number of members of a first binary value and members of a second binary value;
    using the processor to select positions of the pivot code having one of the first binary value and the second binary value to serve as first target positions;
    using the processor to select a second code from the set of binary spreading codes to serve as a derivation code;
    using the processor to replace chips of the second code corresponding to the first target positions of the pivot code with a non-binary value and thereby forming a first ternary spreading code; and,
    the processor using the first ternary spreading code to spread bits of the information signal.

4. The method of claim 3, further comprising:
    using the processor to select positions of the pivot code having another of the first binary value and the second binary value to serve as second target positions;
    using the processor to replace chips of the second code corresponding to the second target positions of the pivot code with a non-binary value and thereby forming a second ternary spreading code;
    the processor using the first ternary spreading code to spread a first data symbol and using the second ternary spreading code to spread a second data symbol.

5. The method of claim 1, wherein said set of binary spreading codes are mutually orthogonal.

6. A method of deriving lower spreading-factor codes from a set of higher spreading-factor codes, each chip of said lower spreading-factor codes having values denoted by 'A', 'B' or null, comprising:
    using a processor to select a first, higher spreading-factor code to be a pivot code, the pivot code comprising a non-zero number of 'A'-valued symbols and a non-zero number of 'B'-valued symbols;
    using the processor to select a second, higher spreading-factor code from which to derive two lower spreading-factor codes;
    using the processor to select chips of said second, higher spreading-factor code corresponding to positions of chips of value 'A' in said pivot code, placing null-valued chips in remaining chip positions in said pivot code to form a first lower-spreading-factor code, and
    using the processor to select chips of said second code corresponding to positions of chips of value 'B' in said pivot code, placing null-valued chips in remaining chip positions in said pivot code to form a second lower-spreading-factor code.

7. The method according to claim 6, wherein said set of higher spreading-factor codes are mutually orthogonal.

8. The method of claim 7, wherein said lower spreading factor codes are mutually orthogonal and orthogonal to said higher spreading factor codes excluding said selected pivot code and said second, higher spreading factor code.

9. The method of claim 6, wherein said value denoted by 'A' is a signal level of +1, wherein said value 'B' is a signal level of −1, and wherein said null value is a signal level of zero.

10. The method of claim 6, further comprising:
    using the first lower-spreading-factor code and the second lower-spreading-factor code to spread data symbols and obtain a chip sequence; scrambling the chip sequence using a real or complex scrambling code.

11. An information symbol transmitter comprising:
    at least a first symbol source for supplying an information signal comprising at least a first stream of I,Q bit pairs;
    means for using either a ternary code or at least one pivot code for spreading the at least first stream of I,Q bit pairs and thereby respectively forming first chips and second chips;

a radio signal modulator for transmitting the first chips and second chips over a radio interface;

wherein the information symbol transmitter is configured to:

select a first code from a set of binary spreading codes to serve as a pivot code, the pivot code having non-zero number of members of a first binary value and non-zero number of members of a second binary value;

select positions of the pivot code having one of the first binary value and the second binary value to serve as first target positions;

select a second code from the set of binary spreading codes to serve as a derivation code;

replace chips of the second code corresponding to the first target positions of the pivot code with a non-binary value and thereby generating the ternary code.

* * * * *

UNITED STATES PATENT AND TRADEMARK OFFICE
CERTIFICATE OF CORRECTION

PATENT NO.         : 8,526,482 B2
APPLICATION NO.    : 11/631790
DATED              : September 3, 2013
INVENTOR(S)        : Dent It is certified that error appears in the above-identified patent and that said Letters Patent is hereby corrected as shown below:

In the Specification

In Column 1, Line 4, delete "internation" and insert -- international --, therefor.

In Column 1, Line 5, delete "file" and insert -- filed --, therefor.

In Column 1, Line 8, delete "Of" and insert -- of --, therefor.

Signed and Sealed this
Eleventh Day of February, 2014

Michelle K. Lee
*Deputy Director of the United States Patent and Trademark Office*